April 12, 1966     I. M. MILLER     3,246,205

CAPACITOR PROTECTIVE DEVICE

Filed July 19, 1962

INVENTOR
IMRICH M. MILLER
BY Darby & Darby
ATTORNEYS

United States Patent Office 3,246,205
Patented Apr. 12, 1966

3,246,205
CAPACITOR PROTECTIVE DEVICE
Imrich M. Miller, 72 E. 35th St., Paterson, N.J.
Filed July 19, 1962, Ser. No. 211,061
7 Claims. (Cl. 317—12)

This invention relates to electric capacitors and more particularly to safety arrangements for capacitors for preventing the fluid within the capacitor casing from leaking out.

As is well known, there are a large number of types of electric capacitors which are used in various electronic and electric circuits for different purposes. Among these types of capacitors is the so-called "can-type," in which the materials forming the capacitor electrodes and the dielectric are located within a metal casing or can. The casing is filled with a suitable fluid, such as a special type of natural or synthetic oil which is used for insulating, dielectric and cooling purposes, and the casing is hermetically sealed at one end thereof with a cover or lid to prevent the fluid from leaking out. In the usual case, the connections to the capacitor electrodes are brought out as terminals on the cover.

A problem arises in can-type capacitors when the fluid in the can abnormally heats up to such an extent as to cause pressure to be built up within the casing. The temperature of the casing fluid can be raised abnormally high, for example, due to a partial short circuit of the capacitor electrodes or an arc over therebetween produced by an application of excessive voltage. The fluid will also heat abnormally when it is contaminated or has deteriorated chemically in the course of its use. When either of these latter two things happen, dielectric heating losses are produced in the fluid causing it to heat up, thereby also generating a pressure within the casing.

All of the above, and other causes of abnormal fluid heating have the equivalent effect of a partial short circuit condition for the capacitor. If this condition is not removed rapidly enough, by removing the current going through the capacitor, then the pressure in the casing will rise to such an extent that the lid will be partially separated from or blown off the casing. When this occurs the fluid is expelled from the casing into the surrounding area. Since the fluid has staining properties and it may also be extremely hot, it can cause damage or injury to the object with which it comes in contact. It is therefore highly desirable to prevent the excessive pressure rise within the casing, thereby substantially eliminating the possibility that the fluid will be allowed to leak out or expelled from the casing.

The present invention is directed to a safety arrangement for removing the current going through the capacitor once pressure builds up within the casing. By doing this soon enough, the pressure buildup within the casing is stopped, thereby preventing the cover from being separated from the casing. The removal of the current through the capacitor is accomplished in the present invention by making use of the distortion or bending of a portion of the casing, preferably the sealing cover, that occurs when pressure first develops in the capacitor. In accordance with the invention, a switching device is provided which is actuated by the casing or cover distortion in a manner to remove the current flowing through the capacitor. In a preferred embodiment of the invention, the switching device is connected to one or more of the terminals through which current is supplied to the capacitor and the switching device operates in accordance with the movement of one or more of these terminals when the cover becomes distorted. In one form of the invention the switching device is connected in series with one side of the line through which current is supplied and located on the cover so that when the cover is first distorted or bent, the switching device opens the circuit applying current to the capacitor electrodes. When the circuit between the current supply and the capacitor electrodes is opened, there can be no further heating of the fluid since there is no current flowing through the capacitor. In another form of the invention, the switching device operates to form a short circuit across both electrodes of the capacitor when the cover is distorted. This causes the current to flow through the short circuit rather than through the capacitor and prevents the fluid from heating up.

Capacitors having the safety devices of the present invention are relatively inexpensive and simple to make. In several of the forms of the invention described below, the safety switching device is made a part of the terminals to which the capacitor electrodes are connected. Therefore, the capacitor element itself can be made in a conventional manner and no changes need be made to the electrode or the dielectric structure. Further, the safety switching device is relatively simple in nature so that it does not add considerably to the cost of manufacturing the capacitor. All in all, the present invention provides a relatively effective safety device at a relatively low cost.

It is therefore an object of this invention to provide safety devices for electric capacitors to prevent the fluid therein from leaking out.

A further object of the invention is to provide safety switching arrangements for capacitors which operate in accordance with the movement of the capacitor terminals caused by the distortion of the capacitor casing.

Another object of the invention is to provide a safety switch arrangement for an electric capacitor which is mounted wholly on the capacitor terminals.

Still another object of the invention is to provide a safety switching device for an electric capacitor of the can-type with the switching device being operated by a distortion or bending of the cover for the can.

A further object of the invention is to provide a safety switching device for a can-type electric capacitor, with the device being operated by the distortion of the cover for the can and being connected in a circuit in a manner to open the connection from one capacitor electrode to the current supply line.

Still a further object of the invention is to provide a safety switching device for an electric capacitor of the can-type, with the device being operated by the distortion of the cover for the can and being connected in a circuit in a manner to provide a complete short circuit between the two electrodes of the capacitor.

Other objects and advantages of the present invention will become more apparent upon reference to the following specification and annexed drawings, in which.

Figure 1:
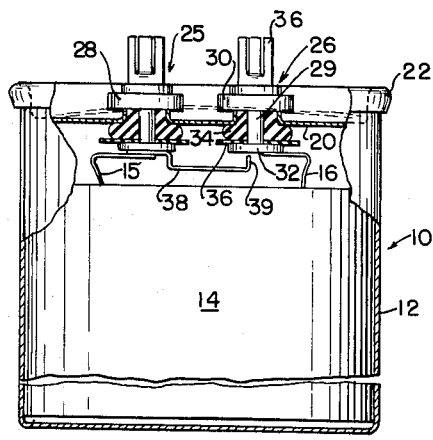
FIGURE 1 shows a front elevational view of an electric capacitor, taken partially in section and partially broken away, showing one embodiment of the present invention in which the capacitor electrodes are to be shorted when the cover is distorted.

In FIGURE 1, there is shown an electric capacitor 10 of the can-type which outwardly appears to be of conventional construction. The capacitor 10 is formed by a casing 12 of generally oval shape having a continuous integrally formed bottom wall 13. A rolled type capacitor unit or subsection 14 is placed within the inner portion, or cavity 11, of the casing. The capacitor unit 14 is of conventional construction (not shown) with the electrodes being formed by two rolled sheets of metallic foil, these sheets being separated by a suitable dielectric material such as a single sheet or laminated layers of waxed paper. A respective tab or connecting strip 15 and 16 is connected to and brought out from each of the metal foil sheets which forms an electrode. The tabs 15 and 16 are to be electrically connected to terminals by which current is to be applied to the capacitor electrodes. The cavity 11 of the casing 12 also contains a quantity of fluid such as pure or synthetic oil or another suitable fluid which is used for dielectric, insulating and cooling purposes. As is well known in the capacitor art, the area of the electrodes, the number of layers of the electrode material, the composition of the dielectric material, and the fluid used in the cavity all determine the capacitance and breakdown voltage rating of the capacitor. In general, the present invention may be used with capacitors of almost any size and voltage rating.

A cover or lid 20 is used to seal the capacitor subsection 14 and the fluid within the casing 12. Cover 20 has a generally flat bottom portion 21 and a lip 22 which is rolled over the upper edge of the casing 12 and then soldered, welded or otherwise suitably sealed around the periphery thereof, so that a complete seal is formed for the casing 12. The electrodes of the capacitor subsection 14 are supplied with current from a suitable source (not shown) through the connecting tabs 15 and 16 by means of the respective terminals 25 and 26 which are mounted on the bottom 21 of the cover 20. The terminals 25 and 26 are similar in construction and are formed by a metal rivet or eyelet 28 having a shank 29 which extends through a hole 31 in the cover 20, an upper head 30 which is outside of the casing 12 and a lower head 32 which is within the casing. The shank 29 of the rivet is insulated from the cover 20 by an insulating member 34 which is preferably made of rubber and shaped to fit over the shank and within the hole 31 to be held by the portion of the cover surrounding the hole. It should be realized, of course, that the member 34 may be of any suitable shape and made of any suitable material, for example, glass, Bakelite, etc. A thin piece of cardboard 33, or other suitable insulating material, a portion of which is shown, is also normally interposed between the bottom of each insulator 34 and the top of the lower rivet head 32 to prevent the tabs 15 and 16 from shorting to the cover 20. An upstanding tab 36 is connected to or formed as an integral part of each of the upper rivet heads 30. A wire (not shown) from the current source is to be connected to each tab 36 to supply current to the respective capacitor electrode. The tabs 15 and 16 from the electrodes of the capacitor subsection 14 are respectively connected to the lower heads 32 of the terminals 25 and 26 by any suitable means such as soldering, welding, etc., to complete the capacitor circuit.

Up to this point, the capacitor described is of conventional construction. However, in accordance with the present invention a switching element or contact 38 is provided to serve as a safety device. The switching contact 38 has one end electrically connected to the lower surface of the lower rivet head 32 of the terminal 25 by any suitable means such as soldering, welding, etc. The unconnected end of contact 38 is formed with a contact member 39 which extends toward the lower surface of the lower rivet head of the terminal 26, but is spaced slightly away from this lower surface. The lower rivet head surface serves as another switching element, although a separate contact can be electrically connected thereto for this purpose if desired. When the capacitor is operating normally, switching contact 38 remains in the position shown in FIGURE 1 and there is a complete electric circuit from one side of the current supply line through terminal 25 and tab 15 to one of the electrodes of the capacitor and from the other side of the supply line through terminal 26 and tab 16 to the other electrode of the capacitor.

When the fluid in the cavity 11 heats up and exerts a pressure within the casing 12, the cover 20 is distorted outwardly in a cantilever manner. This cantilever distortion of the cover occurs because the cover is fastened completely around the edge of the capacitor casing 12. Therefore, because of the cantilever effect, the distortion is greatest at approximately the center of the cover. When the cover is distorted, one or both of the terminals 25 and 26 move angularly and/or upwardly to an extent determined by the location of the respective terminal on the cover. In FIGURE 1, both terminals are illustratively shown as being located approximately the same distance from the casing central axis and therefore both terminals will normally move approximately the same extent. Due to the longer length of the arm of the switching contact 38, however, the bent contact 39 moves a greater extent that the bottom rivet head 32 of the terminal 26. Therefore, the contact 39 engages the lower head 32 of terminal 26 making electrical contact therewith and producing a short circuit between the terminals 25 and 26. The shorting of the terminals of the capacitor causes the current to pass through the short circuit rather than through the capacitor, thereby stopping the fluid heating.

The capacitor of FIGURE 1 is preferably used in applications where the current supply line is fused at some point external to the capacitor. Therefore, when the switching device 38 operates to cause a complete short circuit between terminals 25 and 26, the fuse in the supply line blows and removes the current from the capacitor. This also stops any further fluid heating and pressure buildup within the casing 12 and prevents the cover 20 from being separated from the casing or blown off. It should be recognized that the switching device 38 is also advantageous in the case where only a partial short circuit of the capacitor occurs which does not draw enough current to blow the fuse in the line. When the switching device 38 is used, the pressure buildup caused by the partial short circuit actuates the switching device to produce a complete short circuit to blow the fuse as soon as the cover 20 distorts. This helps in preventing damage to other circuit components which might occur during a prolonged partial short circuit condition.

Figure 1A:
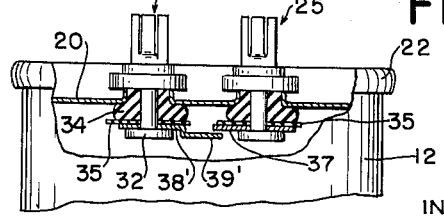
FIGURE 1A shows a portion of a capacitor similar to that of FIGURE 1, in which the switching elements are modified slightly.

FIGURE 1A shows a modified switching element and terminal construction that can be used with any of the embodiments of the present invention. Here, rather than solder or weld the switching elements to the lower heads 33 of the rivets, the switching element 38' is placed over the shank 29 of the terminal rivet on top of the upper surface of the lower head 32 and held in electrical contact therewith by the pressure of the insulator 34. Similarly, the other terminal is provided with a switch element 37' which is mounted on the rivet in the same manner. In this embodiment, the end 39' of element 38' makes electrical contact with the element 38' when the cover distorts. This arrangement has several advantages since it eliminates the necessity of making a special weld or solder joint for the switching elements. Also, the switching elements do not add to the overall space within the casing needed by the non-capacitor members, i.e. rivets, switching elements, etc. If desired, the switching element 37' may be eliminated and electrical contact made by element 38' directly with the rivet head 32. This arrangement of the switching elements being held by pressure rather than a mechanical connection may be used with any of the embodiments of the invention.

Figure 2:
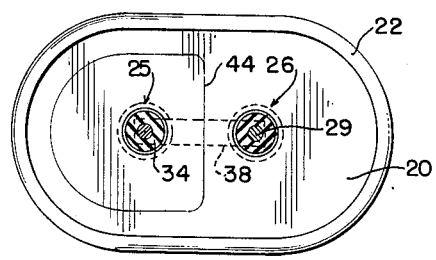
FIGURE 2 is a bottom plan view of the cover of an electric capacitor made according to another embodiment of the invention.

FIGURE 2 shows a modification which can be used for any of the covers 20 of the capacitors of the present invention in order to assure proper safety switching action. In FIGURE 2, the bottom of the cover 20 is provided with a score line 44 which may completely or partially surround the terminal 25 which carries the moving switch contact 38. The score line weakens the portion of the cover it encompasses, so that when the internal pressure is built up in the casing the portion of the cover 20 surrounded by the score line 44 moves before the portion of the cover on which terminal 26 is mounted. Therefore, the switch contact 38 moves upwardly before terminal 26 moves and engagement of switch contact 38 with terminal 26 to produce the short circuit is assured. It should be recognized that any other suitable arrangement may be provided for enhancing the selective bending or distortion of a portion of the cover, for example, a fold on the cover as on the bottom of a tin can, a bellows arrangement, etc.

Figure 3:
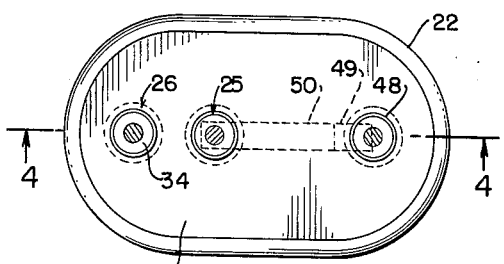
FIGURE 3 is a bottom plan view of the cover for an electric capacitor adapted for use in a circuit wherein one side of the line to the capacitor electrodes is to be opened when the cover is distorted.
Figure 4:
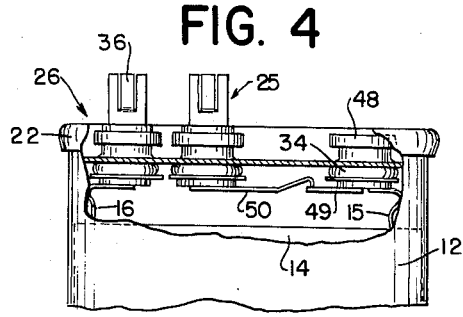
FIGURE 4 is a front elevational view of a portion of the capacitor of FIGURE 3 shown partially broken away.

FIGURES 3 and 4 show another embodiment of the invention which is designed to be used in a situation where the safety device is to open one side of the current supply line to the capacitor. In FIGURES 3 and 4 the current carrying wires are again to be connected to the tab 36 on each of terminals 25 and 26. An electrical connection is provided, as before, from one capacitor electrode through the tab 16 to the terminal 26. An auxiliary terminal 48 is also mounted on the cover and the tab 15 from the other electrode is electrically connected to the bottom head of the rivet of this terminal instead of to terminal 25. Terminal 48 is similar in construction to terminals 25 and 26 with the exception that it does not have the upstanding tab 36. It should also be noted that terminal 48 is located closer to one end of the cover 20 than terminal 25, which is nearer to the center of the cover. Therefore, when the cantilever distortion of the cover occurs, terminal 25 will be moved upwardly further than terminal 48.

A stationary switch contact 49 is electrically connected to the bottom head of the rivet for terminal 48 and a movable switch contact 50 is electrically connected to the bottom head of the terminal 25. Switch contact 50 has an upwardly inclined arm and a downwardly bent end contact portion 51 which normally rests on top of contact 49. During normal operation of the capacitor of FIGURES 3 and 4 current flows from one of the supply lines through terminal 25, switch contacts 50 and 49 and the tab 15 to one electrode of the capacitor. Current flows from the other supply line through terminal 26 and tab 16 to the other capacitor electrode. When internal pressure is developed within the casing 12 of the capacitor of FIGURES 3 and 4, the cantilever distortion of the cover 20 is again produced and the switch contact 50 is bent upwardly a greater distance than the contact 49. Therefore, the circuit to one of the capacitor electrodes through switch contacts 49 and 50 and tab 15 is opened, removing the applied current from the capacitor. This stops any further heating of the fluid within the casing and therefore the capacitor is prevented from heating to a point where the lid will be separated. In the embodiment shown in FIGURES 3 and 4, the score line 44 or a suitable ridge or bellows arrangement can be utilized in order to facilitate upward movement of the terminal 25 before the terminal 48 moves in order to assure the breaking of the circuit in one side of the line. The mounting arrangement shown for the switching elements in FIGURE 1A can also be used, if desired.

Figure 5:
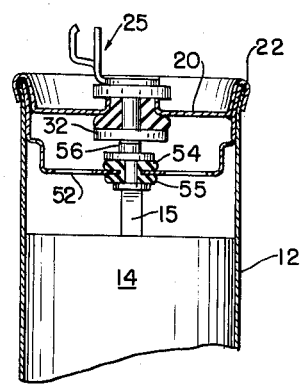
FIGURE 5 is a side elevational view taken in section of a portion of a capacitor of another embodiment of the invention for removing current from a capacitor electrode.

Referring now to FIGURE 5, another embodiment of the invention is shown which is to be used in a situation where one of the current supply lines to one of the capacitor electrodes is to be opened. This embodiment uses a switch contact between one of the tabs 15 or 16 from a capacitor electrode and one of the terminals 25 and 26 rather than providing an auxiliary terminal 48 on the cover 20 as in FIGURES 3 and 4. In FIGURE 5 a narrow strap or bracket 52 is fastened to the inside of the casing 12 by either soldering or welding the strap to the inside of the casing or clamping the edges of the strap underneath the lip 22 of the cover 20. A rivet type terminal 54 is mounted on the strap 52 and insulated therefrom by insulating piece 55. The tab 15 from one of the electrodes is electrically connected to the bottom surface of the terminal 54 and the top surface of the terminal carries a contact member 56 which preferably has a pointed top. The top of contact 56 normally engages the lower stud head 32 of the terminal 25, thereby completing the circuit from one side of the current supply line to the capacitor electrode connected to the tab 15. It should be understood of course, that this switching arrangement can also be used with terminal 26 and tab 16.

In the capacitor of FIGURE 5, the pressure generated within the casing 12 bends the cover 20 outwadly in a cantilever manner as described previously thereby moving terminal 25 upwardly and breaking the electrical contact between contact member 56 and stud head 32. It should be realized that the strap 52 will not move, or will move less than terminal 25. This is so because it is relatively narrow and also because since it is fastened to the side of the casing it is not affected to any extent by the distortion of cover 20. When the contact between member 56 and the stud head 32 is broken, the circuit to the current supply is opened, thereby removing the short circuit within the capacitor and preventing any further pressure buildup.

Figure 6:
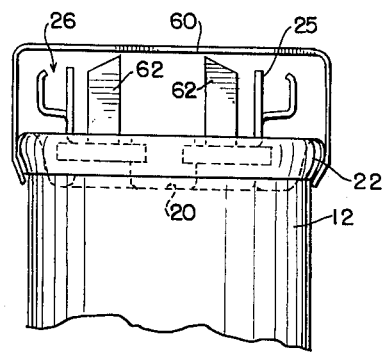
FIGURE 6 is a front elevational view of a portion of a capacitor made in accordance with another embodiment of the present invention in which the capacitor electrodes are to be short circuited.

FIGURE 6 shows another embodiment of the invention which is designed to produce a short circuit once the cover 20 of the casing is deformed slightly. Here, a metal strap 60 is fastened on the outside of the casing 12 above the cover and along the length or across the width thereof. Each of the terminals 25 and 26 carries an additional pointed contact member 62 and the terminals are located so that the ends of the contacts 62 are spaced relatively close to the underside of the strap 60. When pressure builds up within the casing 12 and the cover 20 deforms, the terminals 25 and 26 are bent upwardly. When this occurs, contact members 62 making electrical contact with the underside of the strap 60 producing a short circuit between the two electrodes of the capacitor. This short circuit causes the fuse in the current supply line to blow. If desired, an insulating member can be located on the underside of the strap 60 and a metallic strap bonded to bottom of this insulating member. This will prevent current from flowing through the strap 60 and the casing 12 when the short circuit is produced.

As pointed out before, it should be recognized that in any of the disclosed embodiments of the invention that the scoring line 44, a bellows, or any other suitable arrangement can be utilized in conjunction with one or both of the terminals in order to selectively control the outward expansion of one of the terminals at a faster rate relative to the other terminal. Therefore, scoring lines can be used on the cover around both of the terminals 25 and 26 in FIGURE 6, so that both of the terminals will expand outwardly at a more rapid rate and produce the short circuit. Also, a score line may be provided around terminal 25 in FIG. 5.

While the switch contact members 38 and 50 of FIGURES 1 and 4 were described as simple metallic members, it should be recognized that they can be made of bi-metallic material, if desired. Where bi-metallic material is used the movement of the switching member is additionally controlled by the heat generated within the casing 12. In the case of FIGURE 1, the two metals of the bi-metallic switch contact would be arranged so that the end 39 of the contact is bent upwardly when heat is produced within the casing. In the case of FIGURE 4, the same upward movement would be needed in order to break the circuit.

While the safety switching devices of the present invention have been described for use with a capacitor whose casing is oval in shape, it should be recognized that these devices are effective for all shapes of casings, so long as the cantilever action of the cover is produced. For example, the casing for the capacitor can be round, square, etc., since all of these shapes will cause a cantilever distortion of the cover when the internal pressure is produced. It should also be understood that the safety switching devices can be mounted on the bottom end of the casing 13 rather than on the cover 20 if the terminals 25 and 26 are mounted on that end. In any event, the devices will operate in the same way since the bottom end 13 of the casing is also distorted in a cantilever manner when pressure is produced within the casing.

It can therefore be seen that a relatively simple safety arrangement has been provided for electric capacitors. In all of the embodiments of the invention disclosed, the capacitor subsection is made in the conventional manner and no modifications are needed for it. This gives rise to a capacitor having a safety switching device which is relatively inexpensive to manufacture.

While preferred embodiments of the invention have been described above, it will be understood that these are illustrative only, and the invention is limited solely by the appended claims.

What is claimed is:

1. A protective device for a capacitor comprising a can-type housing, a capacitor within said housing, said capacitor being formed by two electrodes which are separated by a dielectric material, a fluid within said housing, said housing being sealed to retain the capacitor and fluid therein, at least one terminal means mounted on a portion of said housing, said housing portion being deformable in response to a pressure buildup within the housing and moving said terminal means, an electrical connecting element carried by said terminal means and electrically connected thereto, said connecting element being electrically connected in a predetermined manner to only one of said capacitor electrodes when said capacitor is operating normally, the movement of said one terminal means upon deformation of the housing portion moving said connecting element to open the predetermined connection thereof to said one electrode.

2. A protective device for a capacitor comprising a can-type housing, a capacitor within said housing, said capacitor being formed by two electrodes which are separated by a dielectric material, a fluid within said housing, said housing being sealed to retain the capacitor and fluid therein, at least one terminal means mounted on a portion of said housing, said housing portion being deformable in response to a pressure buildup within the housing and moving said terminal means, an electrical connecting element carried by said terminal means and electrically connected thereto, said housing portion also being structurally modified to enhance the selective movement of said terminal means, said connecting element being electrically connected in a predetermined manner to only one of said capacitor electrodes when said capacitor is operating normally, the movement of said one terminal means upon deformation of the housing portion moving said connecting element to open the predetermined connection thereof to said one electrode.

3. A protective device for a capacitor as set forth in claim 2, wherein said structural modification of said housing portion comprises a score line at least partially surrounding said terminal.

4. A protective device for a capacitor comprising a can-type housing, a capacitor within said housing, said capacitor being formed by two electrodes which are separated by a dielectric material, a fluid within said housing, a cover for said housing to seal the capacitor and fluid therein, a terminal mounted on said cover, said terminal carrying a means for electrically connecting the terminal to one of said capacitor electrodes when the capacitor is operating normally, said cover being deformable in response to a pressure buildup within said housing to move the terminal means, the portion of the cover on which said terminal is mounted being formed to move before the remaining portion of the cover under the influence of the pressure buildup to thereby enhance the selective movement of said terminal means upon deformation of the cover, the movement of said terminal means upon deformation of the cover breaking the electrical connection between the terminal and the capacitor electrode.

5. A protective device for a capacitor comprising:
 a can type housing having a portion thereof which is deformable in response to a pressure buildup within said housing,
 first and second electrode means within said housing separated by a dielectric material and forming a capacitor,
 a fluid within said housing, said housing being sealed to retain the fluid and the capacitor therein,
 first and second terminal means mounted on said housing adapted to connect the terminals of said capacitor to a source of alternating current, said second terminal means being mounted on said deformable portion of said housing,
 first means electrically connecting said first terminal means to said first electrode means,
 and second means electrically connecting said second terminal means to said second electrode, said second means including:
   (a) a first conductive member electrically connected to said second terminal means, and
   (b) a second conductive member electrically connected to said second electrode means, said first and second conductive members being in electrical contacting relationship during normal operation of the capacitor to connect said second electrode to said second terminal means, a pressure buildup within the housing causing the deformable portion thereof to move said first and second conductive members with respect to each other whereby the electrical connection between said second terminal means and said second electrode is broken.

6. A protective device for a capacitor comprising a can-type housing, a capacitor within said housing, said capacitor being formed by two electrodes which are separated by a dielectric material, a fluid within said housing, said housing being sealed to retain the capacitor and fluid therein, first and second terminals for said capacitor, a switching means having a conductive member mounted on said housing and movable therewith, said first and second terminals adapted to be connected to a source of alternating current, first conductive means for electrically connecting said first terminal to one of said capacitor electrodes, second conductive means including the conductive member of the switching means mounted on said housing for connecting said second terminal to the other of said capacitor electrodes when the capacitor is operating normally, said housing being deformable is response to a pressure buildup within the housing to move the switching means mounted thereon, the movement of said switching means also moving its conductive member and breaking the electrical connection between said second terminal and its normally connected capacitor electrode.

7. A protective device for a capacitor comprising a can-type housing, a capacitor within said housing, said capacitor being formed by two electrodes which are separated by a dielectric material, a fluid within said housing, a cover for said housing to seal the capacitor and fluid therein, first, second and third terminals mounted on said housing with at least said second and third terminals being mounted on said cover, said first and second terminals adapted to be connected to a source of alternating current, means for electrically connecting said first and third terminals to a respective electrode of the capacitor, a switching element each having a conductive member carried by each of said second and third terminals, said switching elements being arranged to provide an electrical connection through their respective conductive members between said second and third terminals when the capacitor is operating normally, said housing cover being deformable in response to a pressure buildup within the housing to move at least one of the terminals mounted thereon, the movement of at least one of said terminal means moving the said conductive members breaking the electrical contact between the switching elements of said second and third terminals thereby opening the electrical circuit connection between said second terminal and its normally connected capacitor electrode.

References Cited by the Examiner
UNITED STATES PATENTS 2,896,049  7/1959  Maier _____ 317—256 X SAMUEL BERNSTEIN, *Primary Examiner.*

LLOYD McCOLLUM, *Examiner.*